United States Patent
Jenkins et al.

(10) Patent No.: US 7,433,680 B2
(45) Date of Patent: Oct. 7, 2008

(54) INCOMING CALL MANAGEMENT IN A PUSH-TO-TALK COMMUNICATION SYSTEM

(75) Inventors: William Wesley Jenkins, Wheaton, IL (US); Robin Greg Kim, Naperville, IL (US); Laurel Ann Salvador, Wheaton, IL (US); Jeffrey Scott Fischman, Naperville, IL (US); Steven James Pilgrim, Naperville, IL (US)

(73) Assignee: Clarity Communications Systems Inc., Aurora, IL (US)

( * ) Notice: Subject to any disclaimer, the term of this patent is extended or adjusted under 35 U.S.C. 154(b) by 472 days.

(21) Appl. No.: 10/762,622

(22) Filed: Jan. 22, 2004

(65) Prior Publication Data

US 2005/0164682 A1 Jul. 28, 2005

(51) Int. Cl.
*H04L 12/58* (2006.01)
(52) U.S. Cl. ........... 455/412.1; 455/566; 455/412.2; 379/88.12; 379/88.22
(58) Field of Classification Search .......... 455/412.1, 455/413, 417, 426.1, 556.2, 566, 518, 411, 455/412.2, 414.1; 379/201–215, 88.12, 88.22
See application file for complete search history.

(56) References Cited

U.S. PATENT DOCUMENTS

| | | | |
|---|---|---|---|
| 6,185,433 B1 * | 2/2001 | Lele et al. ............... 455/528 |
| 6,216,106 B1 * | 4/2001 | John ............................ 704/270 |
| 7,010,113 B2 * | 3/2006 | Moss et al. ............ 379/210.02 |
| 2002/0077086 A1 * | 6/2002 | Tuomela et al. ............. 455/414 |
| 2003/0119540 A1 * | 6/2003 | Mathis ......................... 455/518 |
| 2004/0127203 A1 * | 7/2004 | Markki et al. ............... 455/418 |
| 2004/0141593 A1 * | 7/2004 | Simpson ................... 379/88.12 |
| 2004/0224678 A1 * | 11/2004 | Dahod et al. ............. 455/426.1 |
| 2005/0089149 A1 * | 4/2005 | Elias ......................... 379/88.13 |
| 2005/0101303 A1 * | 5/2005 | Pelaez et al. ................ 455/413 |

* cited by examiner

*Primary Examiner*—Duc Nguyen
*Assistant Examiner*—Aung T Win
(74) *Attorney, Agent, or Firm*—Patti, Hewitt & Arezina LLC (57) ABSTRACT

A push-to-talk (PTT) communication system provides a destination subscriber (called party) with a flexible incoming call management feature in which an initial voice message associated with the initial PTT incoming call to the called party is temporarily stored at the communication application server and is not transmitted to the called party's mobile terminal. The called party is informed of an incoming call by an alert message from the communication application server causing the called party's mobile terminal to provide an alert. The called party may elect one of several options upon being alerted of an incoming call including transmitting a signal requesting the voice message be played.

23 Claims, 7 Drawing Sheets

INCOMING CALL MANAGEMENT IN A PUSH-TO-TALK COMMUNICATION SYSTEM

BACKGROUND

This invention relates generally to push-to-talk (PTT) voice communication systems, and more specifically relates to an improved capability of such a system that allows a destination subscriber to selectively control the acceptance of incoming calls.

Figure 5:
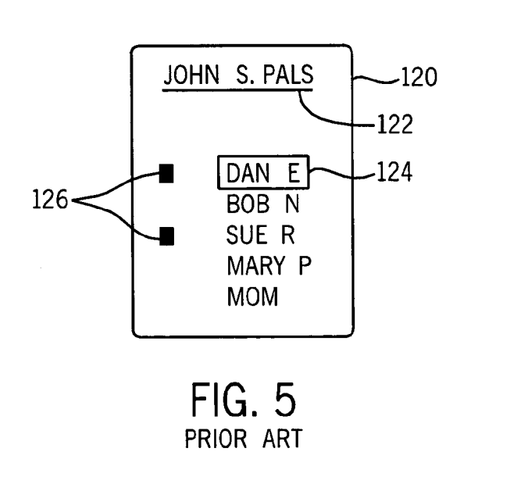
FIG. 5 is an example of a prior art display of a PTT mobile terminal.

Push-to-talk communication systems, such as the Nextel wireless communications system in the United States, are known. Subscribers of such systems utilize a wireless mobile terminal (MT) that includes a push-to-talk button and a display that lists the names of other subscribers on a Pal list such as shown in FIG. 5. Voice communications proceed in a half-duplex mode in which only one subscriber talks, i.e. transmits, at one time while holding down the PTT button. The recipient of the voice communication is determined by the originating subscriber selecting the recipient from among a list of Pals shown on the screen of the originating subscriber's mobile terminal. It is also possible for the originating subscriber to transmit the voice communication simultaneously to a plurality of other subscribers by selecting a group Pal icon that defines a plurality of individual subscribers to receive the communication.

A call is typically initiated by the transmission of a short voice message from an originating PTT subscriber to the destination PTT subscriber. The voice message is entered by depressing the PTT button while inputting a spoken message causing a series of packets containing the spoken message to be delivered to the destination subscriber as determined by the address of the packets. The system attempts to deliver these packets to the destination subscriber's mobile terminal. The destination subscriber's mobile terminal receives the initial voice message, converts the electronic encoded voice message into an analog audio signal, and plays the voice message over the speaker of the destination subscriber's mobile terminal. A first message could be: "Hello Dan, this is John. Are you there?"

The PTT communication technique has an advantage of quickly conveying information via short bursts of voice transmissions, but suffers from privacy and interruption disadvantages. The destination subscriber may move from an environment (driving in a car) where an incoming communication would not cause a problem to another environment (entering a meeting room where a conference is in progress) where the broadcast audio from a new incoming call would create an unwanted interruption. Even if the subscriber is in an environment where an incoming call would not cause an unacceptable interruption, there is the possibility that the originating subscriber's initial voice message could be embarrassing to the destination subscriber, such as receiving, "Hey Dan, are you ready to go to the party?" while the destination subscriber (Dan) is with a client at a job site and had just told the client that he will not be able to finish the job before leaving in order to keep an important prior commitment. Although the subscriber could turn off his PTT mobile terminal, log off the PTT system, or turn down the audio volume to a near off level, these options eliminate the possibility of receiving any PTT communications. If the destination subscriber essentially mutes his audio output, an originating subscriber will not know that the destination subscriber will be unavailable since the destination subscriber's presence state as shown on the originating subscriber's Pal screen display will show the destination subscriber as logged on and available to receive calls. The failure to reach the destination subscriber may lead the originating subscriber to make incorrect assumptions e.g. they ignored me or cause undue concern e.g. why weren't they able to respond. Turning off the PTT mobile terminal or logging off will eliminate the unwanted interruptions, but requires the subscriber to have to power up the terminal and/or log into the service to restore communications.

There exists a need to provide destination PTT subscribers with a way to manage an incoming call that eliminates the uncontrolled audio broadcast of voice messages with an incoming call while still allowing the destination subscriber the flexibility of electing to accept at least some part of the incoming communication. Preferably the originating subscriber should be apprised prior to attempting the call that the destination subscriber is using incoming call management.

SUMMARY OF THE INVENTION

It is an object of the present invention to provide a technological solution that will satisfy this need.

In accordance with an embodiment of the present invention, the exemplary PTT communication system provides a destination subscriber (called party) with an incoming call management feature. To activate the flexible incoming call management feature herein referred to as "FlexAccept", a first subscriber causes his mobile terminal to transmit a command to a communication application server indicating that the FlexAccept feature is to be enabled. A presence state update message is generated and transmitted to subscribers that have the first subscriber as a Pal to indicate that the first subscriber is now in a FlexAccept mode for receiving calls. With the FlexAccept feature enabled, incoming calls to the first subscriber are processed differently by the communication application server. An initial voice message to the first subscriber, which are contained in the payloads of packets transmitted from an originating subscriber, is temporarily stored at the communication application server and is not transmitted to the mobile terminal of the first subscriber. The first subscriber is informed of an incoming call by the transmission of an alert message from the communication application server causing the first subscriber's mobile terminal to provide an alert, e.g. produce a beep sound that is preferably unique to FlexAccept incoming calls. The first subscriber may elect one of several options upon being alerted of an incoming call. The voice message associated with the incoming call that is stored in the communication application server will not be transmitted to the first subscriber's mobile terminal unless the first subscriber transmits a signal requesting the voice message be played.

DETAILED DESCRIPTION

Figure 1:
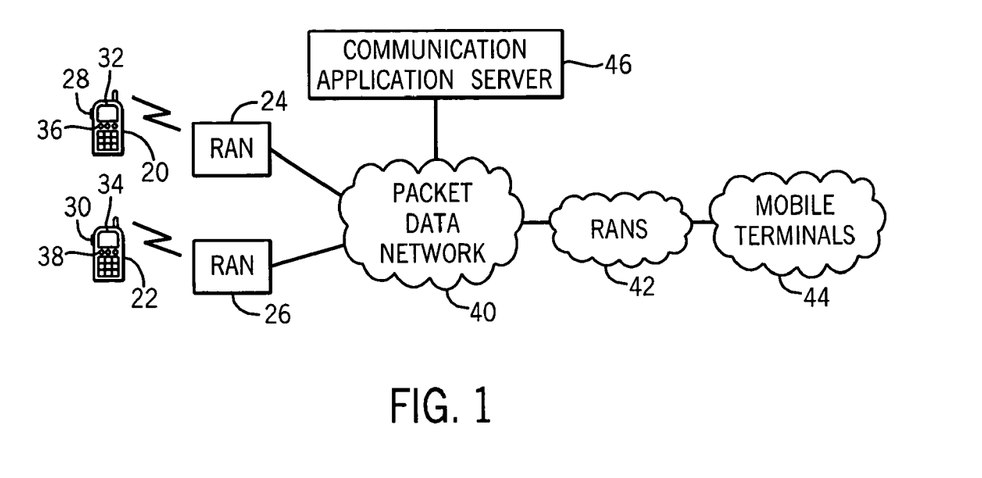
FIG. 1 is a block diagram of a wireless push-to-talk communication system suited for incorporating an embodiment of the present invention.

FIG. 1 is a block diagram of a PTT wireless communications system in which exemplary PTT mobile terminals 20 and 22 have wireless communications supported by radio access nodes (RAN) 24 and 26, respectively. The mobile terminals 20 and 22 have PTT buttons 28 and 30, respectively, that are depressed by the user during a voice transmission. The mobile terminals communicate information such as voice to and from the respective user by receiving and transmitting packets over a radio frequency communication link where the payloads of the packets carry the user's information. The mobile terminals 20 and 22 have visual displays 32 and 34, respectively. The displayed information such as words and symbols assists the user in initiating and receiving communications as well as controlling functions of the mobile terminal. Control buttons 36 and 38 are contained on the respective mobile terminals. The control buttons will typically include a touchtone dialing keypad and other buttons associated with various control functions that may either be dedicated to a specific function or provide control input for a variety of functions that may be defined by indicia shown on the display. As used herein, a PTT mobile terminal refers to a wireless communication device operating in a push-to-talk mode, and a PTT wireless communication system refers to a wireless communication system using a half-duplex mode of communications such as supported by PTT mobile terminals.

A packet data network 40 receives packets and determines the appropriate destination routing based on the packet's address. The packet data network, an addition to supporting communications with RAN's 24 and 26, supports communications with a variety of RAN's 42 that in turn supports a variety of mobile terminals 44. The packet data network also supports the communication of packets with the communication application server 46. As will be explained in detail below, the communication application server 46 supports a delayed message function in accordance with an embodiment of the present invention.

Figure 2:
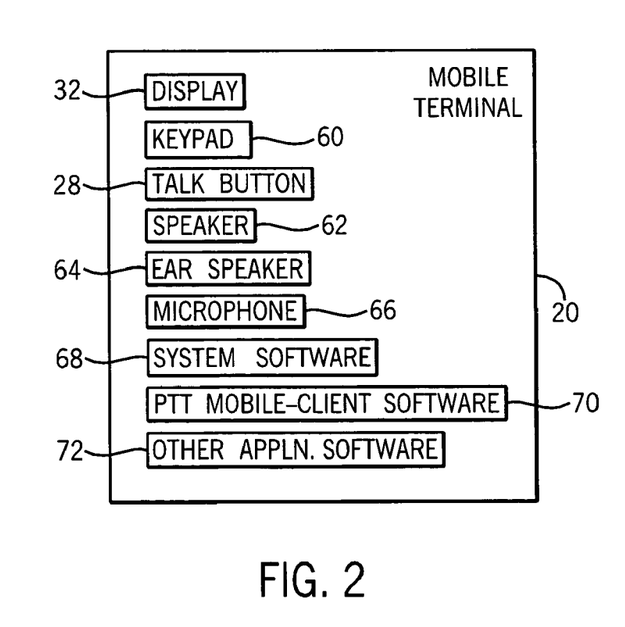
FIG. 2 is a functional block diagram of a PTT mobile terminal in accordance with an embodiment of the present invention.

FIG. 2 is a functional block diagram of exemplary mobile terminal 20. The display 32 and PTT button 28 have been previously described above. A keypad 60 typically includes a touchtone dialing set of buttons and other function related buttons such as directional control and function selection capabilities associated with indicia shown on the display. A speaker 62 converts electronically encoded audio information into sound pressure levels (sound). The ear speaker 64 provides the same function as speaker 62 except that it is typically a small unit worn in or about the ear and produces lower volume sounds intended only for the user wearing the ear speaker. Microphone 66 typically comprises a microphone built-in as part of the mobile terminal that accepts sounds, i.e. user speech, and converts the sounds into electronic signals.

System software 68 consists of basic operational software associated with functions provided by the mobile terminal and may include general input/output control such as operation and control of the keypad, buttons, and display, the control of the transmitter and receiver functions, general operating system functions including microprocessor and memory control, and provide an interface between the local audio and visual inputs/outputs and the communication protocols required for receiving and transmitting packets. The PTT mobile-client software 70 provides additional functionality in accordance with an embodiment of the present invention as will be described in detail below. The other application software 72 may comprise other additional software that provides different functionality for the mobile terminal. For example, the mobile terminal may function in two separate and independent communication modes, e.g. a PTT communication mode and a conventional cellular telephone communication mode, where the PTT communication mode is supported by the system software 68 and the PTT mobile-client software 70, and the cellular telephone communication mode is supported by the system software 68 in combination with the other application software 72.

Figure 3:
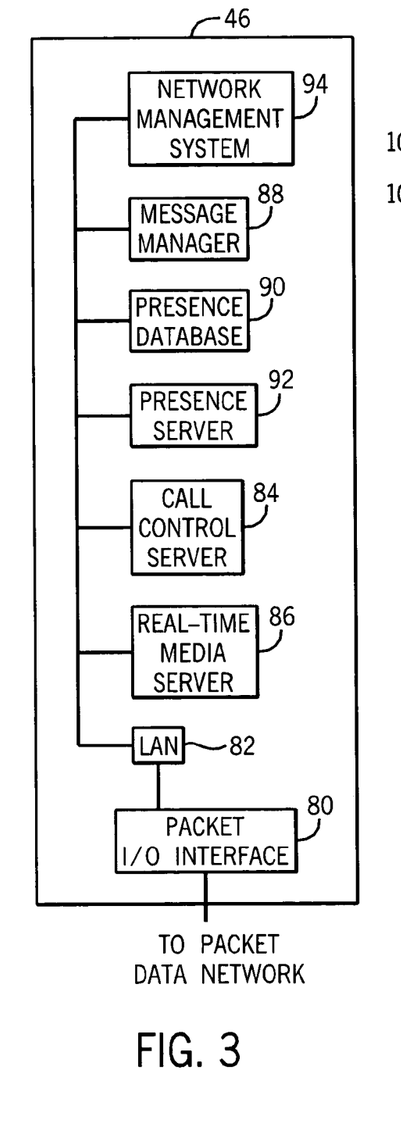
FIG. 3 is a block diagram of the communication application server as shown in FIG. 1.

FIG. 3 is a block diagram of the communication application server 46. A packet input/output interface 80 in combination with a local area network (LAN) 82 provides connectivity among the elements within communication application server 46 and the packet data network 40. Call control server 84 functions as the primary server for call processing. The real-time media server 86 provides temporary voice path buffering to assist in providing a consistent stream of packets to minimize undesired voice path interruptions and also functions as a packet duplicator to supply streams of duplicate packets to multiple terminating legs of a group call. The message manager 88 provides longer-term, e.g. days/weeks, storage of information received by packets from a user and is used in accordance with an embodiment of the present invention to store voice messages intended for later delivery. The presence database 90 stores data related to each PTT subscriber including the presence state of the subscriber's mobile terminal and other information related to services subscribed to by the user. The presence server 92 is a "front-end" server for presence database 90 that collects and distributes presence state updates. The network management system 94 functions as a maintenance server that performs system operations, administration and management functions as well as providing an Internet based end-user access by which subscribers can manage Pal lists.

Figure 4:
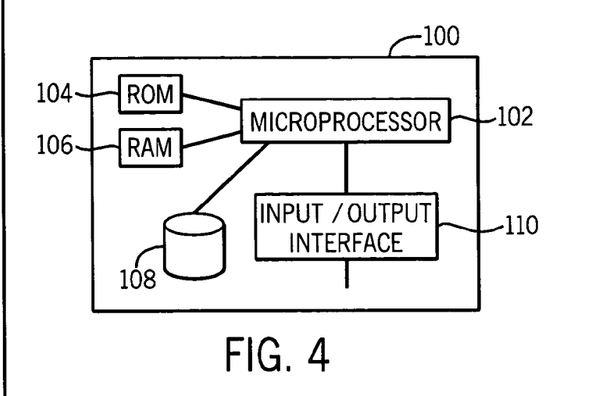
FIG. 4 is a block diagram illustrating an exemplary architecture for each of the elements shown in FIG. 3.

FIG. 4 illustrates an exemplary architecture 100 utilized for each of the elements of the communication application server 46. A microprocessor 102 is supported by read-only memory (ROM) 104, random access memory (RAM) 106 and a non-volatile memory storage element 108. An input/output interface 110 facilitates communications between the microprocessor 102 and external devices. An operating system, application software and system data are stored in memory and provide operating control instructions for microprocessor 102.

FIG. 5 illustrates an exemplary screen display 120 as known in the prior art of a mobile terminal. In this example, "John S." is the user of the mobile terminal with screen display 120 showing at least a partial listing of Pals as indicated by the title 122. The shown list of five Pals can be scrolled using function keys on the mobile terminal to show additional people and/or groups on the Pal list. As shown, the Pal "Dan E." is highlighted at 124 indicating the selection of this Pal for further action or instructions by the user such as by placing a call to the selected Pal. The displayed visual indicia 126 associated with Dan E. and Sue R. indicates that each of these Pals is currently logged in the communication system and is potentially available for communications.

Figure 6:
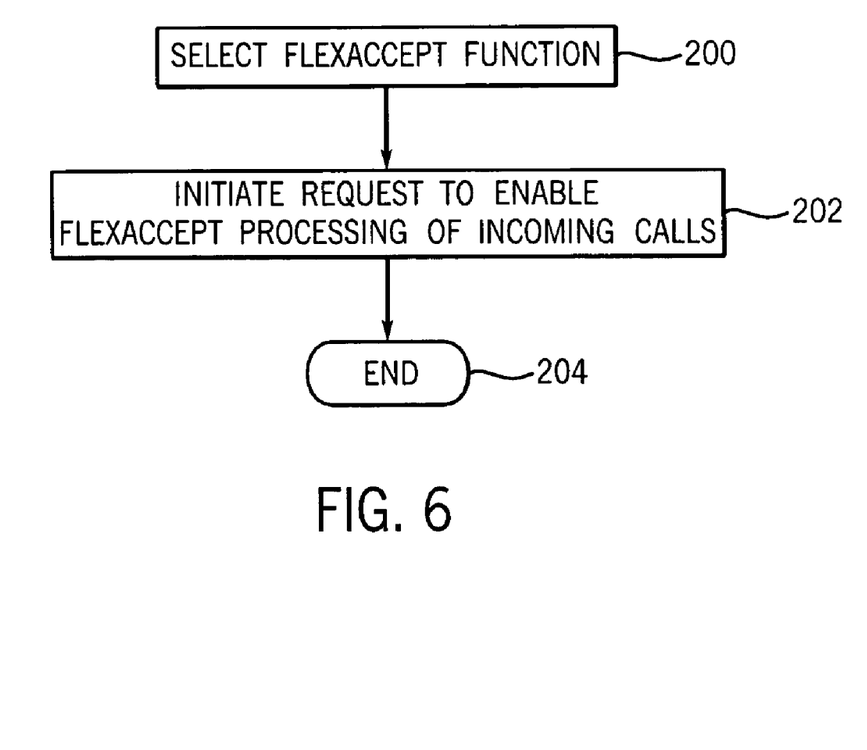
FIG. 6 is a flow diagram of exemplary steps implemented by the mobile terminal of a subscriber to enable the FlexAccept mode in accordance with an embodiment of the present invention.

FIG. 6 is a flow diagram illustrating steps implemented by a mobile terminal to enable FlexAccept processing of incoming calls. In step 200 the FlexAccept function is selected such as by the subscriber pushing a dedicated FlexAccept function button or by using the screen display to access a menu of available functions that includes the FlexAccept function and highlighting the FlexAccept function. In step 202 the user causes the mobile terminal to initiate a request to enable FlexAccept processing of incoming calls. This may be accomplished by the subscriber selecting an "enter" function while the FlexAccept function is highlighted on a screen menu. This causes the mobile terminal in turn to transmit a control message to the communication application server to activate FlexAccept processing for incoming calls to the subscriber associated with the mobile terminal. The request message may comprise a predetermined byte or flag embedded in a field of a header of a packet transmitted to the communication application server or could consist of predetermined information in the payload of a packet. This process terminates at End 204. A similar procedure can be implemented by the mobile terminal to turn off FlexAccept processing of calls at the communication application server.

Figure 7:
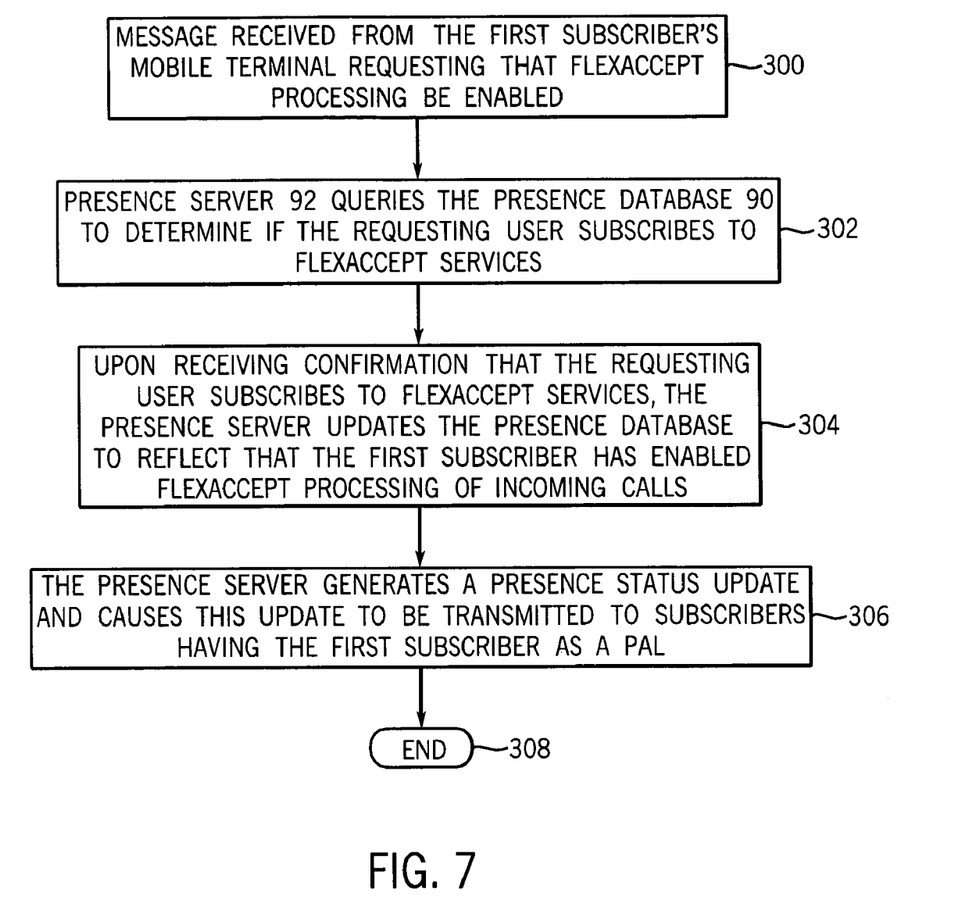
FIG. 7 is a flow diagram of exemplary steps taken by the communication application server to enable FlexAccept processing of incoming calls to a subscriber's mobile terminal in accordance with an embodiment of the present invention.

FIG. 7 shows exemplary steps taken by the communication application server to enable FlexAccept processing of incoming calls. In step 300 the communication application server 46 receives a control message from the first subscriber's mobile terminal 20 requesting that FlexAccept processing be enabled for handling incoming calls. Preferably, the mobile terminals contain sufficient intelligence to directly address a packet to the specific server element within the communication application server needed to act on a request transmitted from the mobile terminal. The presence server 92 queries the presence database 90 in step 302 to determine if the requesting user subscribes to FlexAccept services. In step 304 the presence server receives confirmation from the presence database 90 that the requesting user is a subscriber of FlexAccept services. The presence server then proceeds to update the presence database to reflect that FlexAccept processing of incoming calls to the first subscriber is to be utilized. In step 306 the presence server generates a presence status update and causes this update to be transmitted to subscribers having the first subscriber as a Pal. Now the communication application server is configured to utilize FlexAccept processing for incoming calls to the first subscriber and subscribers with the first subscriber as a Pal are alerted that the first subscriber is "quasi-available" due to the use of FlexAccept processing as indicated by the presence state indicia associated with the first subscriber. Processing terminates at End 308. A similar procedure can be implemented by the communication application server to turn off FlexAccept processing of calls upon receiving a request by the subscriber to turn off (deactivate) FlexAccept processing.

Figure 8:
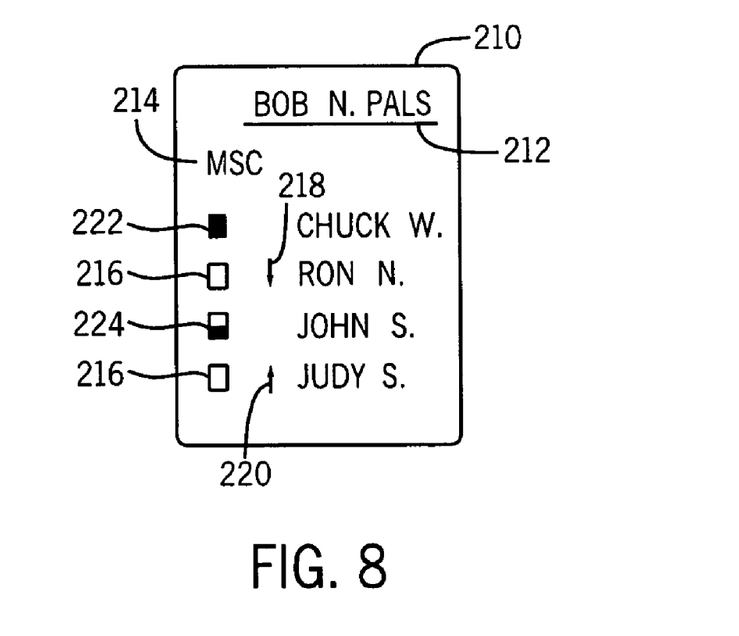
FIG. 8 is an exemplary screen display of a user showing indicia representing that a Pal has enabled the FlexAccept feature.

FIG. 8 illustrates an exemplary screen display 210 of subscriber Bob N. as indicated by the title line 212. The screen display is representative of a time following the completion of steps described in FIG. 7. The first subscriber, John S., is one of the four illustrative Pals listed in display 210. A message status column (msc) 214 contains indicia denoting information about stored messages for corresponding Pals. The down arrow 218 associated with Ron N. indicates that a message from him is waiting to be delivered to Bob N. The up arrow 220 associated with Judy S. indicates that a message to her from Bob N. has not yet been delivered. The indicia 222, e.g. a filled rectangle, associated with Chuck W. indicates that he is logged in and available to receive communications. The indicia 216, unfilled rectangles associated with Pals Ron N and Judy S, indicate that these Pals are not available. The indicia 224, e.g. a half-filled rectangle, associated with John S. (the first subscriber) indicates that he is logged in and is using FlexAccept processing to manage incoming calls. That is, John S. is screening incoming calls and may not be available or elect to accept an incoming call. Thus, the indicia 224 gives notice to subscribers that the Pal John S. may not elect to accept incoming calls. When the first subscriber chooses to disable FlexAccept processing, a present status update will again be transmitted by the communication application server to those with the first subscriber as a Pal, and will cause the indicia 224 to change to a filled rectangle indicating that the first subscriber is logged in and is accepting calls in a normal mode, i.e. FlexAccept processing is not being utilized. Or, a user may logout which will cause their appearance on Pal lists to have en empty rectangle indicating they are unavailable.

Figure 9:
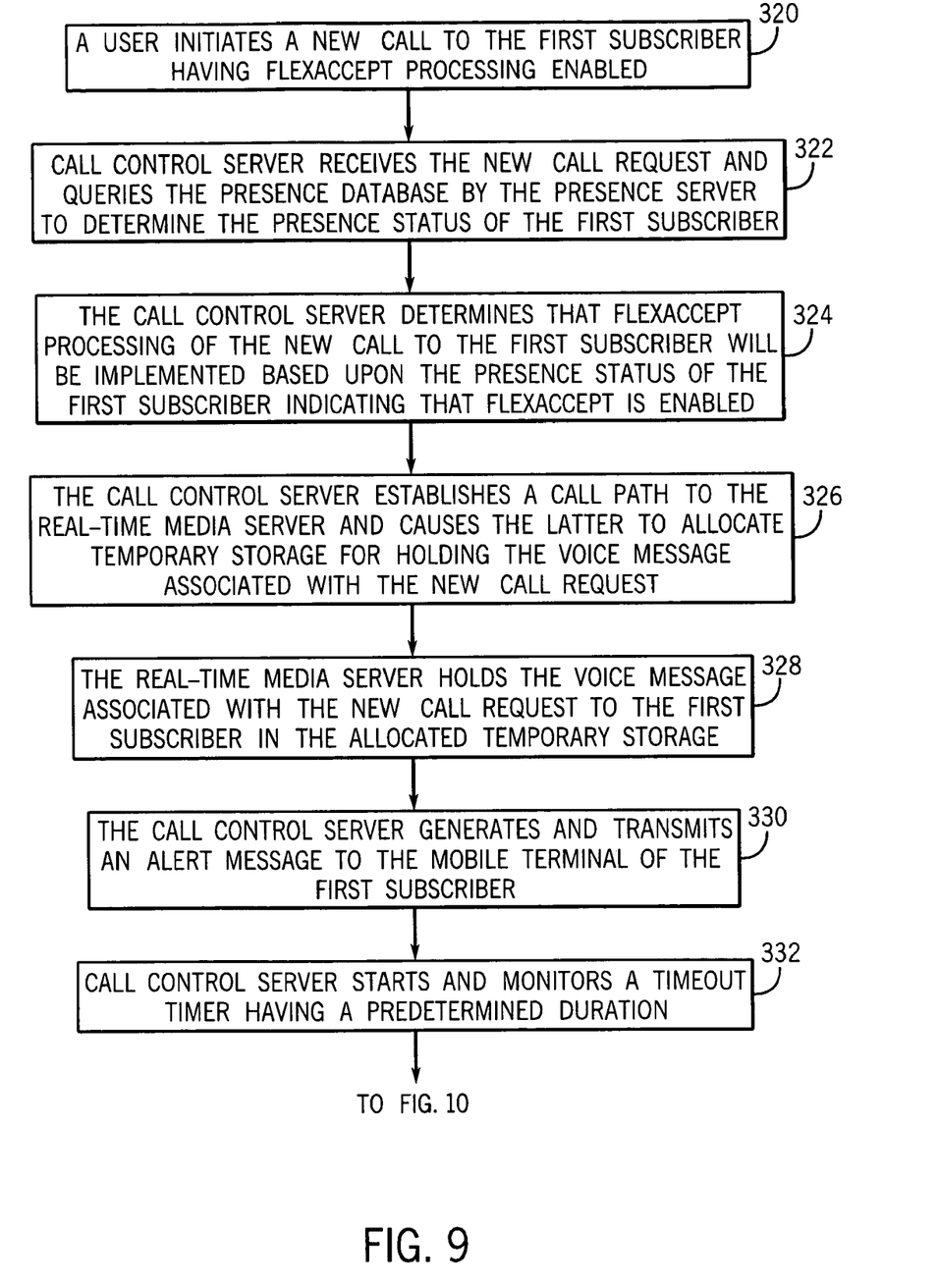
FIGS. 9 and 10 together form a flow diagram illustrating the processing by the communication application server of an incoming call to a subscriber that has FlexAccept enabled in accordance with an embodiment of the present invention.
Figure 10:
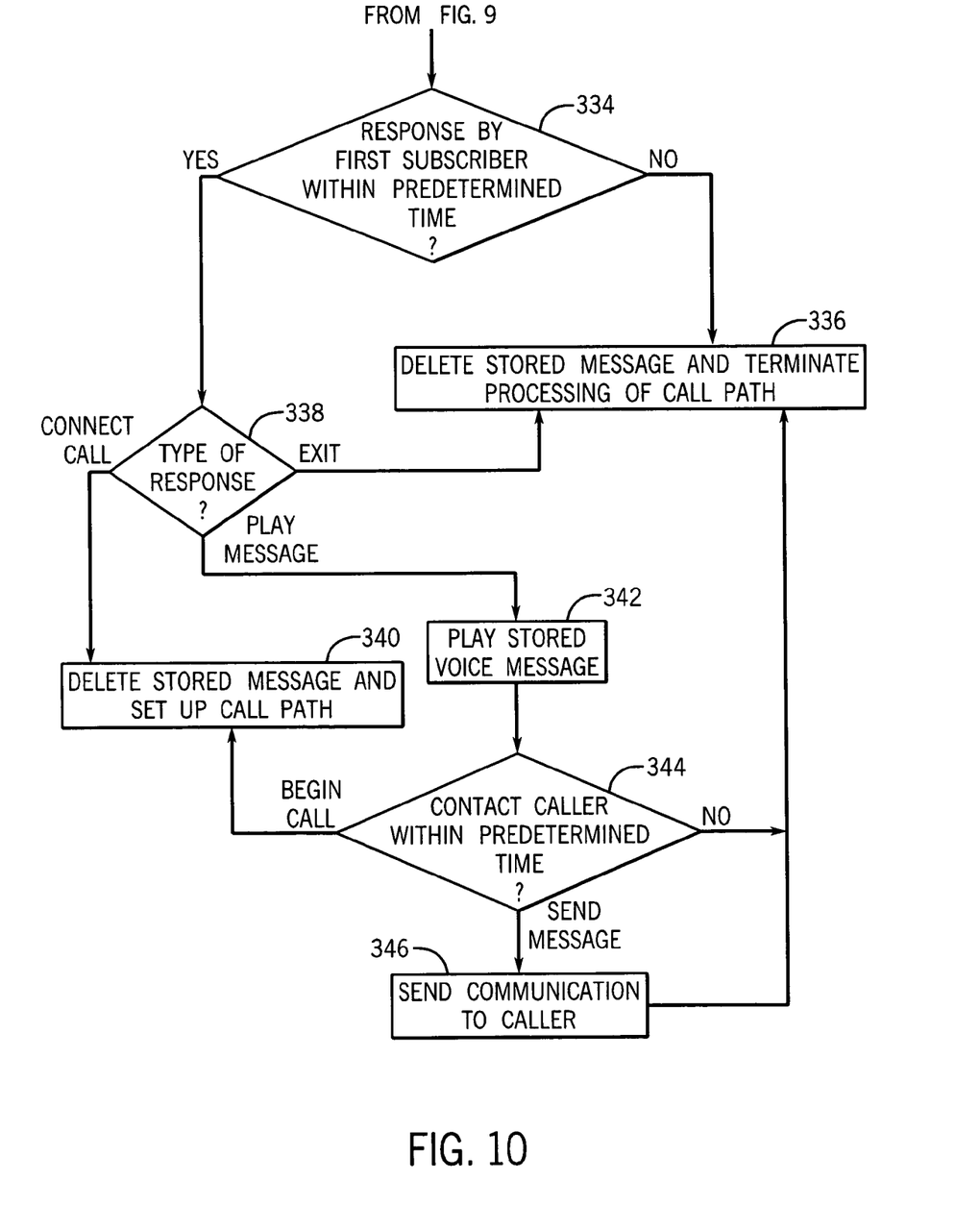

FIGS. 9 and 10 illustrate a flow diagram of FlexAccept processing implemented by the communication application server for an incoming call. In step 320 a user 22, Bob N., initiates a new call to be processed by the communication application server 46 to the first subscriber 20, John S., who has previously enabled FlexAccept processing of incoming calls. In step 322 the call control server 84 receives the new call request and queries the presence database 90 by the presence server 92 to determine the presence status of the called party, the first subscriber. The call control server 84 in step 324 determines that FlexAccept processing of incoming calls to the first subscriber is to be implemented based upon the FlexAccept presence status of the first subscriber. The call control server checks the presence status of destination subscribers as part of the call setup processing. In step 326 the call control server 84 establishes a call path to the real-time media server 86 and causes the latter to allocate storage (memory) for holding the voice message from Bob N. associated with the new call request. In step 328 the real-time media server 86 receives the voice message input by Bob N. associated with the new call initiation to John S. and stores it in memory. The call control server 84 in step 330 generates and transmits an incoming call alert message to the mobile terminal of the first subscriber. The alert message does not carry the voice message input by Bob N. It provides a command to the mobile terminal to generate an alert, e.g. a short beep sound, to the subscriber indicating an incoming call. In step 332 the call control server 84 starts and continues to monitor a timeout timer having a predetermined duration. The purpose of the timeout timer is to give the called party a time interval in which to determine whether or not the incoming call will be accepted.

In step 334 a determination is made by the call control server 84 of whether the first subscriber has responded within the predetermined time. A NO determination at step 334 causes the stored voice message held at the real-time media server 86 to be deleted and the call control server 84 to terminate processing of call paths associated with the incoming call request. This terminates processing of the call request. A YES determination at step 334 causes a further determination to be made at step 338 as to the type of response received from the called party. If the response from the called party is a "connect call" response, such as made by the called party pressing the PTT button in response to the incoming call, the stored voice message in the real-time media server 86 is deleted and a normal voice call path is set up by the call control server 84 between the calling and called parties at step 340. The ongoing call will continue until terminated in accordance with normal processing by the communication application server 46. If an "Exit" response from the called party is determined by the call control server 84 at determination step 338, such as caused by the receipt of a command initiated by the called party to immediately terminate the new call request, then the call attempt will be ended at step 336. An exit response could be made by the called party in order to be able to immediately initiate a call to other than the calling party. If the response from the called party is determined by the call control server 84 at determination step 338 to be a "play message" response, then the real-time media server 86 will be instructed to play the temporarily stored voice message from the calling party to the called party as indicated at step 342. The play message response may be initiated from the called party's mobile terminal by the called party pushing a predefined function key corresponding to this function or selecting a corresponding command function from a menu displayed on the screen. The called party may elect to have the message played through an earpiece to minimize disruptions to others and maintain privacy depending upon the current environment of the called party. In step 344, following the voice message having been played to the called party, a determination is made by the call control server 84 of whether to generate a communication to the called party within the predetermined time interval, e.g. 5-20 seconds. A NO determination results in processing as explained with regard to step 336. A Begin Call determination results in processing as explained with regard to step 340. A "send message" determination at step 344 results in a communication being sent to the caller at step 346. This communication could be a simple acknowledgement signal only indicating that the voice message was received by the called party. Or the communication could be a stored, prerecorded voice message, e.g. "I am in a meeting and unavailable until 3 P.M.", that can be elected by an input by the called party, or can be set to automatically be played in response to incoming calls while in the FlexAccept processing mode. Step 346 terminates with processing at step 336.

The amount of feedback provided to the calling party upon making a call to a party with FlexAccept enabled is a significant consideration. The following is the preferred amount of information to be provided to the calling party during call initiation to a subscriber with FlexAccept enabled. The calling party is not provided with feedback from the communication application server to indicate whether or not the called party elected to have the calling party's voice message played. This protects the privacy of the called party and enables the called party to exercise their discretion on whether to accept the incoming call knowing that the calling party will not be aware that the called party listened to the initial voice message but elected not to accept the call. Because of system protocols in an embodiment of the invention, if the called party explicitly elects to exit the call attempt such as at step 338, the calling party will receive information that will indicate that the called party declined to accept the call. However, the called party can just let the predetermined time expire in order to maintain privacy. Alternatively, the system could be designed to provide privacy even when an explicit call exit is elected by the called party.

Figure 11:
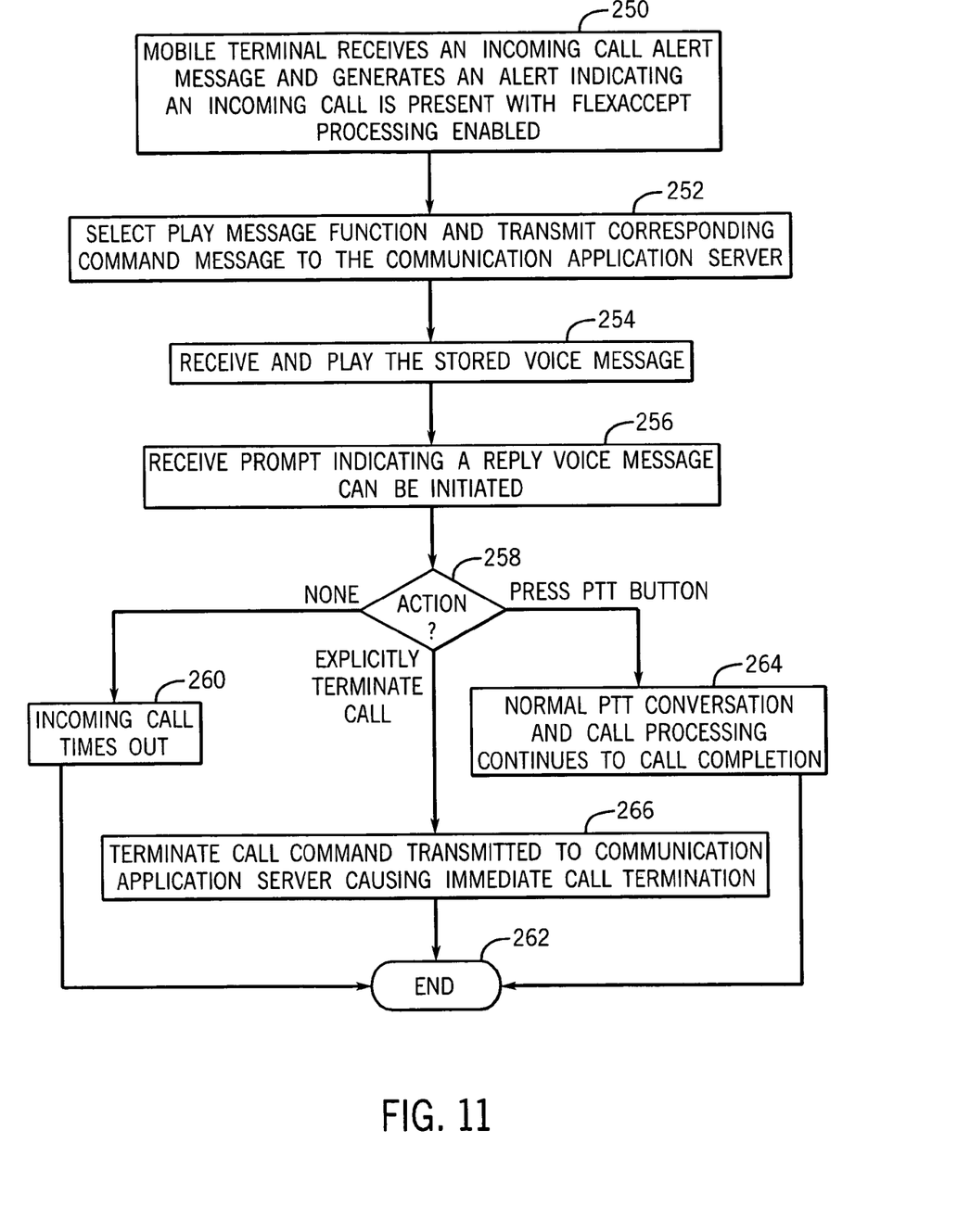
FIG. 11 is a flow diagram of exemplary steps implemented by the destination mobile terminal in response to receiving an incoming call while FlexAccept is enabled in accordance with an embodiment of the present invention.

FIG. 11 is a flow diagram of exemplary steps implemented by the destination mobile terminal in response to receiving an incoming call while FlexAccept is enabled and where the decision is made by the user to listen to the calling party's voice message. In step 250 a destination mobile terminal receives an incoming call alert message and generates an alert, e.g. a short audible beep, indicating an incoming call is present with FlexAccept processing enabled. In this example the called party elects to listen to the voice message associated with the initial call from the calling party. In step 252 the called party selects a play message function on the display screen causing a corresponding command message to be transmitted to the communication application server. The command message may consist of a packet with a predetermined byte or flag in a field in the header of the packet corresponding to this command. In step 254 the destination mobile terminal receives the stored voice message and plays it to the subscriber. Depending upon the environment of the subscriber, the subscriber may elect to have the voice message played over an earpiece to avoid disruption of others and/or to maintain privacy of the message. Following receipt of the voice message, in step 256 the mobile terminal receives a prompt from the communication application server indicating that a reply voice message can be initiated. The prompt is a normal indication associated with PTT communications indicating that an incoming communication is finished and that the "floor" (communication path) is open for initiating a new transmission in the existing call path.

In step 258 the determination is made of what action, if any, is to be taken following the playing of the voice message. A "none" determination represents that the destination subscriber elects to take no action upon having listened to the voice message and allows the incoming call request to timeout as indicated that step 260. This will terminate processing of the associated incoming call as indicated at End 262. A "Press PTT button" determination at step 258 means that the destination mobile terminal detected that the user pressed the PTT button indicating that the user is electing to proceed with a normal PTT conversation with the calling party and that the call will continue until a normal call completion as indicated at step 264. This terminates processing at End 262. An "Explicitly Terminate Call" determination at step 258 causes a terminate call command to be transmitted from the destination mobile terminal to the communication application server causing an immediate termination of the call request as indicated at step 266. The destination subscriber may desire to immediately terminate the incoming call request, rather than waiting for the timeout timer to expire, such as where the terminating subscriber desires to immediately originate a new call to another party. This will terminate processing of the FlexAccept incoming call as indicated at End 262.

Various modifications, while remaining within the scope of the present invention, can be made to the above described embodiments. For example, the functions of the different servers and elements that make up the communication application server can be combined and reside in a smaller number of physical elements, or can be further separated to reside in a larger number of physical elements. Also, various functions of the illustrative communication application server can be provided in a different physical location, e.g. outside the communication application server, in a more distributed environment. For improved reliability the communication application server or elements in it can be duplicated for fault tolerance. Also a plurality of communication application servers can be utilized where one server serves a specific community of users, or where multiple servers serve one community of users.

In another embodiment, instead of the voice message being stored at the communication application server, the voice message could be forwarded to the destination mobile terminal utilizing FlexAccept processing with a control signal indicating to the mobile terminal that the voice message is to be held in storage at the mobile terminal instead of being converted into an analog signal and played. In this situation, the mobile terminal would wait for an input from the subscriber before playing the message. This would effectively distribute the load of storing voice messages due to FlexAccept processing to the mobile terminals rather than having centralized storage at the communication application server. It would however create a requirement that a minimum amount of memory for storage be made available in the mobile terminal.

In a further embodiment the initial voice message from the originating subscriber for a call to a destination subscriber utilizing FlexAccept processing, the voice message could be stored in memory at the originating subscriber's mobile terminal. In this embodiment the mobile terminal of the originating subscriber would send a call request to the communication application server for a call to the destination subscriber, but the associated voice message would be held in storage at the originating subscriber's mobile terminal. If the destination subscriber utilizing FlexAccept processing desired to hear the voice message stored in the originating subscriber's mobile terminal, a command signal could be sent via a communication application server to the originating mobile unit causing it to then transmit the voice message to the destination mobile terminal. Once requested, the voice message could be transmitted by the communication application server to the destination mobile terminal as a normal voice transmission. This would have the advantage of minimizing traffic on the network. For example, in situations where the destination mobile does not make a request to hear the voice message from the originating subscriber, the voice message would never have to be transmitted over any part of the network. A disadvantage of this embodiment is that the originating party may be able to observe whether or not the destination party listened to the voice message by observing transmission indicators, if any, associated with the originating party's mobile terminal.

In a further embodiment the status indicators are updated on only a limited basis in order to minimize bandwidth loading due to update messages transmitted by the communication application server to the mobile terminals. For example, each mobile terminal affected by a change in status may not be immediately notified of the change. Mobile terminals could be updated with status changes as part of the exchange of control packets at the beginning of a new communication request by a mobile terminal. In another option the mobile terminals would be updated with status changes only at periodic intervals that could vary depending on the overall traffic load of the network. For example, during a busy traffic time when many mobile terminals are engaging in voice communications, status updates could be deferred or limited in the number of mobile terminals being updated in order to maintain sufficient bandwidth to accommodate user communication demands.

An incorrect current status of the presence of a Pal at a mobile terminal should not have a substantial adverse impact on the embodiments of the present invention. If a user attempts to initiate a real-time communication to a Pal with FlexAccept enabled but where the user is provided with an indication that the Pal is not using FlexAccept, the user will be alerted by a unique talk-beep based on a command received from the communication application server indicating that the called party is using FlexAccept prior to the user's first voice transmission. Thus the user will be made aware that the called party is using FlexAccept before entering a voice message even if the FlexAccept status indication was inaccurate due to the lack of a recent update. The communication application server will treat an incoming request for communications with a called party based on the status of the called party stored at the server even if the calling party's mobile terminal indicates a different status of the called party. Similarly, if a user attempts to initiate a real-time communication to a Pal without FlexAccept enabled but where the user's mobile terminal indicates the user that the Pal is using FlexAccept, the user will be alerted by a normal real-time talk-beep (different from a FlexAccept talk-beep) based on a command received from the communication application server indicating that the called party is not using FlexAccept prior to the user's first voice transmission. The "talk-beep" is typically an audible sound, but could be a visual indication instead of or in addition to an audible sound.

Visual indicia can comprise the display of various words, letters, numbers, symbols, fonts, colors, shading, and the lack of any displayed indicia, i.e. a blank background. Alerts can comprise a change of condition that is humanly perceptible, and more commonly include visual, audible, and the sense of touch.

The invention claimed is:

1. A method implemented by a push-to-talk wireless mobile terminal for communicating voice information comprising the steps of:

determining if a first input from a user of a first mobile terminal is made requesting that selectable acceptance management be initiated for incoming calls not yet initiated to the first mobile terminal;

if said determining step determines that the request has been made, transmitting from the first mobile terminal a first control message to a communication application server representing an instruction to implement selectable acceptance of future incoming calls to the first mobile terminal, where selectable acceptance includes storing at the communication application server an initial voice message associated with an incoming call from a calling party to the first mobile terminal and transmitting the stored initial voice message to the first mobile terminal from the communication application server during a first real-time communication session with the calling party only upon the communication application server receiving a playback signal from the first mobile terminal where the playback signal is distinct from another signal generated by the first mobile terminal upon a depression of a push-to-talk button on the first mobile terminal to answer an incoming call;

receiving at the first mobile terminal the stored initial voice message in response to the transmission of the playback signal, where the stored initial voice message is received at the first mobile terminal while the calling party remains in the first real-time communication session with the communication application server and without the first mobile terminal having answered the incoming call by depression of the push-to-talk button on the first mobile terminal.

2. The method of claim 1 further comprising the steps of:

determining if a depression of the push-to-talk button on the first mobile terminal has been made after the first mobile terminal has received the stored initial voice message;

upon determining a depression during the first real-time communication session of the push-to-talk button on the first mobile terminal has been made after the first mobile terminal has received the stored initial voice message, the first mobile terminal transmitting a reply voice communication during the first real-time communication session to the calling party.

3. The method of claim 1 further comprising the steps of receiving at the first mobile terminal the initial voice message so that the communication application server provides no indication to the calling party of whether or not the initial voice message was delivered to the first mobile terminal, thereby preserving privacy of availability of the user of the first mobile terminal.

4. The method of claim 1 further comprising the steps of:
alerting the user of the first mobile terminal of an incoming call from the calling party;
receiving a second input at the first mobile terminal from the user following the alerting where the second input is one of selectable acceptance options selectable by the user of the first mobile terminal of action to be taken as part of the selectable acceptance;
transmitting by the first mobile terminal a second control message to the communication application server in response to the second input where the second control message represents an instruction to the communication application server for the communication application server to implement a voice playback to the calling party during the first real-time communication session of a stored voice message of availability status of the user of the first mobile terminal followed by automatic termination of the incoming call originated by the calling party, where said playback is not an announcement of a voice mail system.

5. A push-to-talk wireless mobile terminal for communicating voice information comprising:
means for determining if a first input from a user of a first mobile terminal is made requesting that selectable acceptance management of incoming calls yet to be initiated to the first mobile terminal;
means for transmitting from the first mobile terminal a first control message to a communication application server representing an instruction to implement selectable acceptance for future incoming calls to the first mobile terminal if said determining means determines that the request has been made, where selectable acceptance includes storing an initial voice message at the communication application server associated with an incoming call from a calling party to the first mobile terminal and transmitting the stored initial voice message to the first mobile terminal from the communication application server during a first real-time communication session with the calling party only upon the communication application server receiving a playback signal from the first mobile terminal where the playback signal is distinct from another signal generated by the first mobile terminal upon a depression of a push-to-talk button on the first mobile terminal to answer an incoming call;
means for receiving at the first mobile terminal the stored initial voice message in response to the transmission of the playback signal, where the stored initial voice message is received at the first mobile terminal while the calling party remains in the first real-time communication session with the communication application server and without the first mobile terminal having answered the incoming call by depression of the push-to-talk button on the first mobile terminal.

6. The mobile terminal of claim 5 further comprising:
means for determining if a depression of the push-to-talk button on the first mobile terminal has been made after the first mobile terminal has received the stored initial voice message;
upon determining a depression during the first real-time communication session of the push-to-talk button on the first mobile terminal has been made after the first mobile terminal has received the stored initial voice message, a transmitter of the first mobile terminal transmitting a reply voice communication during the first real-time communication session to the calling party.

7. The mobile terminal of claim 5 further comprising means for receiving at the first mobile terminal the initial voice message so that the communication application server provides no indication to the calling party of whether or not the initial voice message was delivered to the first mobile terminal, thereby preserving privacy of availability of the user of the first mobile terminal.

8. The mobile terminal of claim 5 further comprising:
means for alerting the user of the first mobile terminal of an incoming call from the calling party;
means for receiving a second input at the first mobile terminal from the user following the alerting where the second input is one of selectable acceptance options selectable by the user of the first mobile terminal of action to be taken as part of the selectable acceptance;
means for transmitting by the first mobile terminal a second control message to the communication application server in response to the second input where the second control message represents an instruction to the communication application server for the latter to implement a voice playback to the calling party during the first real-time communication session of a stored voice message of availability status of the user of the first mobile terminal followed by automatic termination of the incoming call originated by the calling party, where said playback is not an announcement of a voice mail system.

9. A method implemented by a communication application server that processes communications among users in a push-to-talk communication network comprising the steps of:
receiving a first control message from a first mobile terminal where the first control message represents an instruction to initiate a process providing selectable acceptance of yet to be received incoming calls to the first mobile terminal;
in response to the first control message, updating a stored presence state associated with the first mobile terminal to reflect that future incoming calls to the first mobile terminal will be processed in accordance with the selectable acceptance;
receiving, with selectable acceptance having been implemented by the first mobile terminal, an incoming call from a second mobile terminal for the first mobile terminal during a first real-time communication session where a voice message from the second mobile terminal comprises part of the incoming call;
storing the voice message in memory;
transmitting an incoming call alert message to the first mobile terminal during the first real-time communication session where the incoming call alert message does not contain the voice message;
receiving a playback message from the first mobile terminal during the first real-time communication session, where the playback message represents a request to transmit the stored voice message from storage at the beginning of the voice message to the first mobile terminal during the first real-time communication session only upon receipt of the playback message, where the playback message is different from a signal corresponding to depression of a push-to-talk button on the first mobile terminal to answer a call;
transmitting to the first mobile terminal the stored initial voice message in response to the transmission of the playback signal, where the stored initial voice message is received at the first mobile terminal while the calling party remains in the first real-time communication session and without the first mobile terminal having answered the incoming call by depression of the push-to-talk button on the first mobile terminal.

10. The method of claim 9 further comprising the initial voice message is transmitted to the first mobile terminal without providing any indication to the second mobile terminal of whether or not the initial voice message was delivered to the first mobile terminal, thereby preserving privacy of availability of the user of the first mobile terminal.

11. The method of claim 10 further comprising the step of not providing any indication to the second mobile terminal of the receipt of the second control message or that the first stored initial voice message was transmitted to the first mobile terminal.

12. The method of claim 9 further comprising transmitting a presence status update message to mobile terminals having the first mobile terminal as a Pal upon updating the presence state associated with the first mobile terminal to be in a selectable acceptance state, where the selectable acceptance state of the first mobile terminal is displayed on the Pal's mobile terminals as a unique state distinguishable from all other states.

13. The method of claim 9 further comprising starting a timeout timer associated with the receipt of the incoming call where the timeout timer has a predetermined time period and upon the timeout timer reaching the predetermined time period causing processing of the incoming call to the first mobile terminal to be aborted.

14. The method of claim 13 further comprising starting a timeout timer associated with the receipt of the incoming call where the timeout timer has a predetermined time period and upon the timeout timer reaching the predetermined time period, before receiving a reply communication from the first mobile terminal, causing processing of the incoming call to the first mobile terminal to be aborted.

15. The method of claim 14 wherein the causing the processing of the incoming call to the first mobile terminal to be aborted includes deleting the initial voice message stored in memory.

16. The method of claim 9 further comprising starting a timeout timer associated with the receipt of the incoming call where the timeout timer has a predetermined time period and upon receiving a reply communication from the first mobile terminal before the timeout timer reaching the predetermined time period, causing the initial voice message from the second mobile terminal to be transmitted to the first mobile terminal.

17. A communication application server that processes communications among users in a push-to-talk communication network comprising:

means for receiving a first control message from a first mobile terminal where the first control message represents an instruction to initiate a process providing selectable acceptance of yet to be received incoming calls to the first mobile terminal;

means for updating, in response to the first control message, a stored presence state associated with the first mobile terminal to reflect that future incoming calls to the first mobile terminal will be processed in, accordance with the selectable acceptance;

means for receiving an incoming call, with selectable acceptance having been previously implemented by the first mobile terminal, from a second mobile terminal for the first mobile terminal during a first real-time communication session where an initial voice message from the second mobile terminal comprises part of the incoming call;

means for storing the initial voice message in memory;

means for transmitting an incoming call alert message to the first mobile terminal during the first real-time communication session where the incoming call alert message does not contain the initial voice message;

means for receiving a playback message from the first mobile terminal during the first real-time communication session, where the playback message represents a request to transmit the stored initial voice, message to the first mobile terminal during a real-time communication session only upon receipt of the playback message, where the playback message is different from a signal corresponding to depression of a push-to-talk button on the first mobile terminal to answer a call;

means for transmitting to the first mobile terminal the stored initial voice message in response to the transmission of the playback signal, where the stored initial voice message is received at the first mobile terminal while the calling party remains in the first real-time communication session and without the first mobile terminal having answered the incoming call by depression of the push-to-talk button on the first mobile terminal.

18. The communication application server of claim 17 further comprising means for transmitting a presence status update message to mobile terminals having the first mobile terminal as a Pal upon updating the presence state associated with the first mobile terminal to be in a selectable acceptance state, where the selectable acceptance state of the first mobile terminal is displayed on the Pal's mobile terminals as a unique state distinguishable from all other states.

19. The communication application server of claim 17 further comprising means for preventing any indication from being sent to the second mobile terminal of the receipt of the playback message and of an indication that the stored initial voice message was transmitted to the first mobile terminal.

20. The communication application server of claim 17 further comprising means for starting a timeout timer associated with the receipt of the incoming call where the timeout timer has a predetermined time period and means for causing processing of the incoming call to the first mobile terminal to be aborted upon the timeout timer reaching the predetermined time period.

21. The communication application server of claim 20 further comprising means for starting a timeout timer associated with the receipt of the incoming call where the timeout timer has a predetermined time period and means for causing processing of the incoming call to the first mobile terminal to be aborted upon the timeout timer reaching the predetermined time period before receiving a reply communication from the first mobile terminal.

22. The communication application server of claim 21 wherein the means for causing the processing of the incoming call to the first mobile terminal to be aborted includes means for deleting the initial voice message stored in memory.

23. The communication application server of claim 17 further comprising means for starting a timeout timer associated with the receipt of the incoming call where the timeout timer has a predetermined time period and means for causing the initial voice message from the second mobile terminal to be transmitted to the first mobile terminal upon receiving a reply communication from the first mobile terminal before the timeout timer reaching the predetermined time period.

* * * * *